(12) United States Patent
Schreter et al.

(10) Patent No.: US 10,896,062 B2
(45) Date of Patent: Jan. 19, 2021

(54) INTER-PROCESS MEMORY MANAGEMENT

(75) Inventors: Ivan Schreter, Malsch (DE); Daniel Booss, Wiesloch (DE)

(73) Assignee: SAP SE, Walldorf (DE)

( * ) Notice: Subject to any disclaimer, the term of this patent is extended or adjusted under 35 U.S.C. 154(b) by 1013 days.

(21) Appl. No.: 13/290,848

(22) Filed: Nov. 7, 2011

(65) Prior Publication Data
US 2013/0117522 A1 May 9, 2013

(51) Int. Cl.
*G06F 9/50* (2006.01)
*G06F 12/084* (2016.01)

(52) U.S. Cl.
CPC .......... *G06F 9/5016* (2013.01); *G06F 12/084* (2013.01); *G06F 2209/504* (2013.01); *Y02D 10/00* (2018.01)

(58) Field of Classification Search
None
See application file for complete search history.

(56) References Cited

U.S. PATENT DOCUMENTS

| | | | | |
|---|---|---|---|---|
| 5,577,243 A | * | 11/1996 | Sherwood | G06F 12/023 |
| 6,779,183 B1 | * | 8/2004 | Chekuri et al. | 718/105 |
| 7,814,290 B1 | * | 10/2010 | Pliss | G06F 12/0253 711/171 |
| 2005/0097296 A1 | * | 5/2005 | Chamberlain | G06F 12/023 711/170 |
| 2005/0262324 A1 | * | 11/2005 | Mathiske | 711/170 |
| 2005/0273568 A1 | * | 12/2005 | Blandy | 711/170 |
| 2008/0320203 A1 | * | 12/2008 | Fitzgerald | 711/5 |
| 2010/0169536 A1 | * | 7/2010 | Shedel et al. | 711/6 |
| 2010/0191929 A1 | * | 7/2010 | Rawson, III | 711/170 |
| 2010/0318998 A1 | * | 12/2010 | Golla | 718/104 |
| 2011/0138147 A1 | * | 6/2011 | Knowles et al. | 711/170 |
| 2011/0283071 A1 | * | 11/2011 | Yokoya et al. | 711/162 |
| 2012/0297395 A1 | * | 11/2012 | Marchand et al. | 718/104 |

* cited by examiner

*Primary Examiner* — Khoa D Doan
*Assistant Examiner* — Marwan Ayash
(74) *Attorney, Agent, or Firm* — Mintz Levin Cohn Ferris Glovsky and Popeo, P.C.

(57) ABSTRACT

A memory allocator assigns temporary memory limits to each of a plurality of processes requiring memory. Thereafter, at least one assigned temporary memory limit is changed during execution of a corresponding process. Related apparatus, systems, techniques and articles are also described.

9 Claims, 2 Drawing Sheets

INTER-PROCESS MEMORY MANAGEMENT

TECHNICAL FIELD

The subject matter described herein relates to techniques for process-based memory allocation.

BACKGROUND

Memory management acts to dynamically allocate portions of memory to processes at request and to free such portions of memory when they are no longer needed. Memory management is particularly critical in systems simultaneously executing numerous processes. One conventional approach is to provide operating system supported paging (e.g., virtual memory, etc.). With paging, an undefined set of (possibly important) memory pages are moved from memory to secondary storage. Accessing this secondary storage can result in unnecessary input/output (I/O) transactions when such pages are later required which can slow significantly impact system performance.

SUMMARY

In one aspect, a memory allocator assigns temporary memory limits to each of a plurality of processes requiring memory. Thereafter, at least one assigned temporary memory limit is changed during execution of a corresponding process.

A global memory limit can be defined that specifies an aggregate amount of memory to be consumed by all of the plurality of processes. With such cases, the memory allocator assigns the temporary memory limits to the plurality of processes such that the global memory limit is not exceeded. The global memory limit can dynamically change which results in the memory allocator changing at least one temporary memory limit.

The memory allocator can use a vector in shared memory to store memory limits, current memory consumption and control data. Each process can have an associated slot in the vector. Each slot can specify a number of bytes allocated by the memory allocator to the process. The temporary memory limit for each process can be stored in the corresponding slot. Each slot can specify an absolute process limit specific to the process which the temporary memory limit cannot exceed.

The processes having temporary memory limits which have been reduced in response to the increasing memory limit of another process can be signaled to free at least a portion of their cached data. All signaled processes can free a proportional amount of their cached data.

The freed cached data can be returned to an operating system executing the memory allocator. The memory allocator can subsequently allocate at least a portion of the memory returned to the operating system.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, methods can be implemented by one or more data processors either within a single computing system or distributed among two or more computing systems.

The subject matter described herein provides many advantages. For example, the techniques described herein can be used to optimizing memory management of large systems which use multiple processes that each can consume a significant amount of memory.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
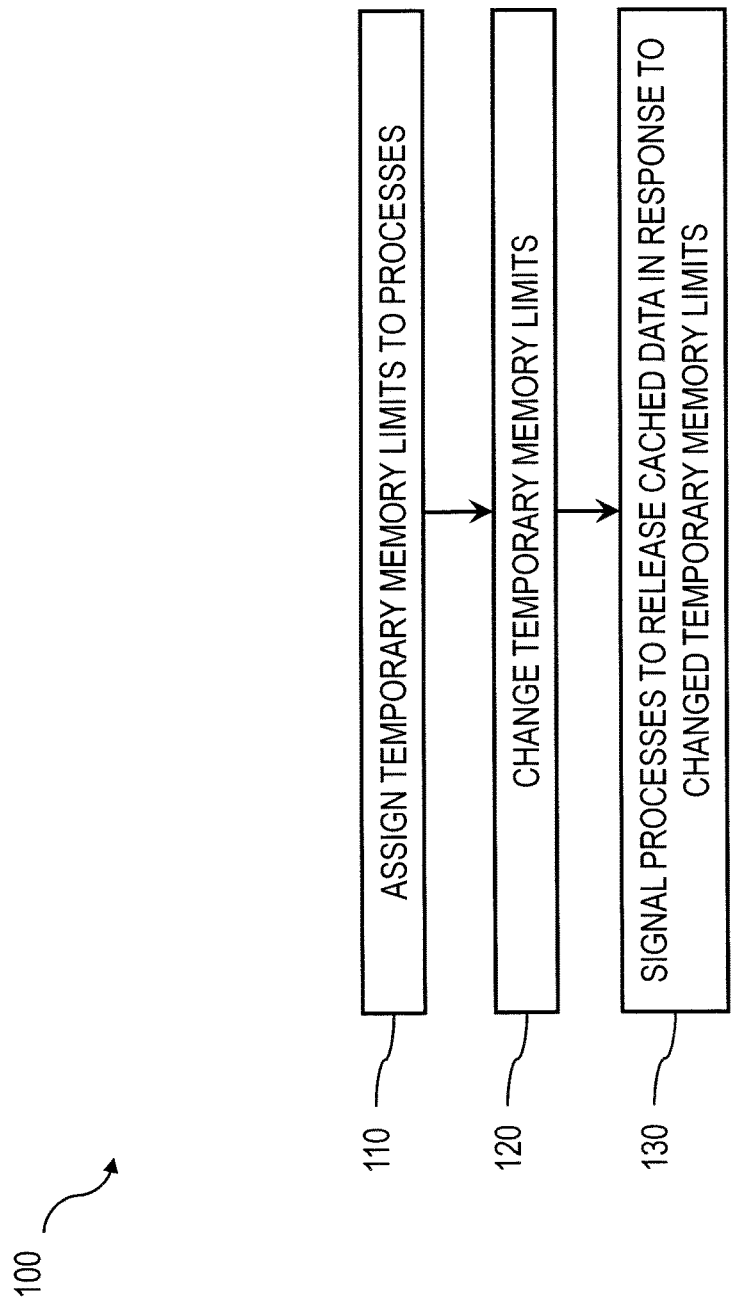
FIG. 1 is a process flow diagram illustrating a technique for allocating memory among a plurality of concurrently executing processes.

FIG. 1 is a diagram illustrating a process 100, in which, at 110, a memory allocator assigns temporary memory limits to each of a plurality of processes requiring memory. Thereafter, at 120, at least one assigned temporary memory limit can be changed during execution of a corresponding process. In addition, optionally, at 130, signaling processes having changed temporary memory limits which have been reduced to free at least a portion of their cached data.

Figure 2:
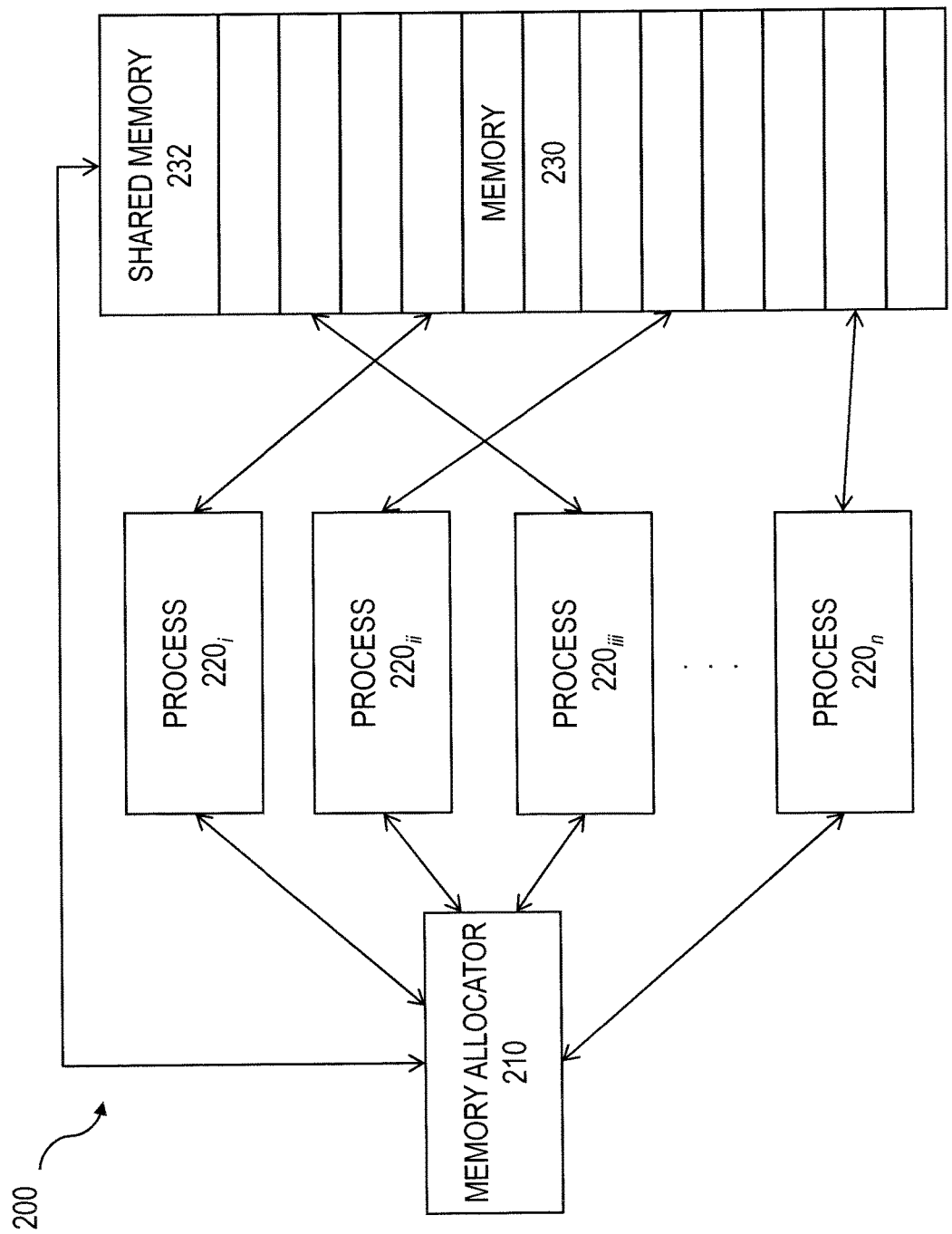
FIG. 2 is a logic diagram illustrating allocation of memory by a memory allocator to a plurality of processes.

FIG. 2 is a diagram 200 illustrating a memory allocator 210 assigning or otherwise allocating certain amounts/portions of memory 230 to each of a plurality of processes $220_{i \ldots n}$ requiring memory. At least some of these processes $220_{i \ldots n}$ can execute concurrently and are assigned, by the memory allocator, specified blocks of memory 230 (i.e., the blocks are specifically identified, etc.). These blocks can be of fixed-size or they can be variable.

For each process $220_{i \ldots n}$ taking part in the inter-process memory management, a slot is stored in a vector in shared memory 232. Each slot contains process specific information about the process $220_{i \ldots n}$ and its consumption of memory 230. This information can include, for example, a unique identifier of the process $220_{i \ldots n}$ (e.g., process ID and creation time, etc.), (ii) a number of bytes allocated by the memory allocator 210 to this process $220_{i \ldots n}$; and/or (iii) a temporary memory limit for the memory consumption. This temporary memory limit can be changed but it must not exceed a process limit particular to the process $220_{i \ldots n}$ (which in some cases can also be stored in the slot) and/or the sum of all temporary memory limits cannot exceed a global memory limit.

The temporary memory limits can be introduced to keep the number of global operations (e.g., reading/locking, etc.) low. As stated above, a global memory limit can be defined and compared to a sum of all allocated bytes by all the processes. But then each change (i.e., each allocation/deallocation) would require a global lock. Stated differently, to guarantee that the global limit is not exceeded a global lock can be used and the number of allocated bytes can be changed (BEFORE allocating memory and AFTER checking that the sum of allocated bytes is<=the global limit). In addition, instead of the lock, a variable could be used which stores the sum of the allocated bytes (however this might result in collisions of the cache line). Alternatively, the temporary limit can be initialized at 1 GB (if the sum is below the global limit, otherwise a lower temporary limit has to be used). As long as the number of allocated bytes remain below the temporary limit (of the process) no global locking is needed (no collisions on the cache line). If the number of allocated bytes will get higher than the temporary limit, the global lock will first have to be acquired and then the temporary limits changed (or use the sum of the temporary limits in variable which is atomically updated).

In case a memory request of a calling process $220_{i...n}$ cannot be fulfilled immediately (due to a process $220_{i...n}$ reaching its corresponding temporary memory limit and/or increasing temporary memory limit of memory 230 allocated to a particular process $220_{i...n}$ would cause a global memory limit to be exceeded), the temporary memory limits of other processes $220_{i...n}$ are lowered, so the calling process $220_{i...n}$ may use the memory 310 that was freed by the other processes $220_{i...n}$. To achieve this, all other processes $220_{i...n}$ can be signaled to free some cached data. In some cases, each signaled process $220_{i...n}$ releases a an amount of memory proportional to its overall usage (e.g., 15%, etc.) while in other cases each signaled process $220_{i...n}$ can release a fixed amount of memory (regardless of overall memory consumption). In some cases, the processes $220_{i...n}$ can be grouped, ranked or otherwise categorized such that certain processes $220_{i...n}$ are signaled to release different amounts of memory as compared to other processes $220_{i...n}$ (e.g., 15% versus 10%, etc.). After the caches are appropriately reduced (and the associated portions of memory 230 are returned to the operating system), the memory allocator 210 can signal or cause the processes $220_{i...n}$ to signal the calling process $220_{i...n}$ to allocate required memory from the operating system. Only if it is not possible to free enough cached memory in other processes, an allocation will fail.

Memory 230 freed by a process $220_{i...n}$ can be kept in a process-local cache or quick reuse. When a signal to decrease memory consumption is received by a process $220_{i...n}$, unused memory blocks are first returned to the operating system, only then real caches are shrunk (i.e., really consumed memory is released as opposed to allocated, but unused memory), as needed. This approach can enable coarse-grained memory allocations done by a process-local memory manager, not for individual allocations (i.e., on the same level as operating system memory manager).

Aspects of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. A method comprising:
   assigning, by a memory allocator, a temporary memory limit to each of a plurality of processes requiring memory in a shared memory, the assigning of the temporary memory limit being based on a vector in the shared memory, the vector comprising a plurality of slots, each slot storing, for a corresponding one of the plurality of processes, a unique identifier for the corresponding one of the plurality of processes, a quantity of bytes allocated to the corresponding one of the plurality of processes, and the temporary memory limit for memory consumption by the corresponding one of the plurality of processes, wherein a sum of each of the temporary memory limits stored in the vector cannot exceed a global memory limit representative of a maximum amount of shared memory to be consumed by the plurality of processes;
   receiving a memory request of a first process of the plurality of processes;
   determining, based on the vector, that the first process has exceeded a first temporary memory limit and/or that increasing the first temporary memory limit would exceed the global memory limit;
   signaling, in response to the determining, a second process of the plurality of processes to reduce a second temporary memory limit of the second process;
   reducing, during execution of the second process of the plurality of processes and based on the determining, the second temporary memory limit corresponding to the second process being executed, the second process releasing an amount of memory to the shared memory in response to the reducing and storing the released memory in a process-local cache, the amount of memory released proportional to the overall usage of the second temporary memory limit of the second process;

signaling, in response to reducing the second temporary memory limit of the second process, the first process to allocate memory from the shared memory, wherein the first process is assigned an increased first temporary memory limit;

receiving a second memory request of the first process of the plurality of processes;

determining that the first process has exceeded the increased first temporary memory limit and that an allocation of bytes to the first process will exceed the global memory limit; and activating, in response to determining that the first process has exceeded the increased first temporary memory limit and that the allocation of bytes to the first process will exceed the global memory limit, a global lock during which the temporary memory limit to each of the plurality of processes is changed.

2. A method as in claim 1, wherein the reducing of the second temporary memory limit causes the plurality of processes to free a proportional amount of cached data.

3. The method as in claim 1, further comprising:

maintaining, by the memory allocator, an amount of bytes, in the shared memory, assigned to an operating system in which the plurality of processes are running, and wherein the signaling includes a request to the plurality of processes, having temporary memory limits which have been reduced, to free at least a portion of cached data to the bytes assigned to the operating system, thereby increasing the bytes assigned to the operating system.

4. The method of claim 1, further comprising freeing, in response to the signaling the second process, unused memory blocks in the shared memory.

5. The method of claim 1, wherein the shared memory comprises a plurality of memory blocks and each process of the plurality of processes is allocated a specific memory block.

6. A system comprising:

at least one data processor;

at least one memory coupled to the at least one data processor, the at least one memory storing instructions, which when executed, cause the at least one data processor to perform operations comprising:

assigning, by a memory allocator, a temporary memory limit to each of a plurality of processes requiring memory in a shared memory, the assigning of the temporary memory limit being based on a vector in the shared memory, the vector comprising a plurality of slots, each slot storing, for a corresponding one of the plurality of processes, a unique identifier for the corresponding one of the plurality of processes, a quantity of bytes allocated to the corresponding one of the plurality of processes, and the temporary memory limit for memory consumption by the corresponding one of the plurality of processes, wherein a sum of each of the temporary memory limits stored in the vector cannot exceed a global memory limit representative of a maximum amount of shared memory to be consumed by the plurality of processes;

receiving a memory request of a first process of the plurality of processes;

determining, based on the vector, that the first process has exceeded a first temporary memory limit and/or that increasing the first temporary memory limit would exceed the global memory limit;

signaling, in response to the determining, a second process of the plurality of processes to reduce a second temporary memory limit of the second process;

reducing, during execution of the second process of the plurality of processes and based on the determining, the second temporary memory limit corresponding to the second process being executed, the second process releasing an amount of memory to the shared memory in response to the reducing and storing the released memory in a process-local cache, the amount of memory released proportional to the overall usage of the second temporary memory limit of the second process; and signaling, in response to reducing the second temporary memory limit of the second process, the first process to allocate memory from the shared memory, wherein the first process is assigned an increased first temporary memory limit;

receiving a second memory request of the first process of the plurality of processes;

determining that the first process has exceeded the increased first temporary memory limit and that an allocation of bytes to the first process will exceed the global memory limit; and activating, in response to determining that the first process has exceeded the increased first temporary memory limit and that the allocation of bytes to the first process will exceed the global memory limit, a global lock during which the temporary memory limit to each of the plurality of processes is changed.

7. A system as in claim 6, wherein the reducing of the second temporary memory limit causes the plurality of processes to free a proportional amount of cached data.

8. A non-transitory computer program product storing instructions which, when executed by at least one data processor forming part of at least one computing system, result in operations comprising:

assigning, by a memory allocator, a temporary memory limit to each of a plurality of processes requiring memory in a shared memory, the assigning of the temporary memory limit being based on a vector in the shared memory, the vector comprising a plurality of slots, each slot storing, for a corresponding one of the plurality of processes, a unique identifier for the corresponding one of the plurality of processes, a quantity of bytes allocated to the corresponding one of the plurality of processes, and the temporary memory limit for memory consumption by the corresponding one of the plurality of processes, wherein a sum of each of the temporary memory limits stored in the vector cannot exceed a global memory limit representative of a maximum amount of shared memory to be consumed by the plurality of processes;

receiving a memory request of a first process of the plurality of processes;

determining, based on the vector, that the first process has exceeded a first temporary memory limit and/or that increasing the first temporary memory limit would exceed the global memory limit;

signaling, in response to the determining, a second process of the plurality of processes to reduce a second temporary memory limit of the second process;

reducing, during execution of the second process of the plurality of processes and based on the determining, the second temporary memory limit corresponding to the second process being executed, the second process releasing an amount of memory to the shared memory in response to the reducing and storing the released memory in a process-local cache, the amount of memory released proportional to the overall usage of the second temporary memory limit of the second process;

signaling, in response to reducing the second temporary memory limit of the second process, the first process to allocate memory from the shared memory, the allocated memory including at least a portion of the released amount of memory of the second process, wherein the first process is assigned an increased first temporary memory limit;

receiving a second memory request of the first process of the plurality of processes;

determining that the first process has exceeded the increased first temporary memory limit and that an allocation of bytes to the first process will exceed the global memory limit; and activating, in response to determining that the first process has exceeded the increased first temporary memory limit and that the allocation of bytes to the first process will exceed the global memory limit, a global lock during which the temporary memory limit to each of the plurality of processes is changed.

9. The computer program product as in claim 8, wherein the reducing of the second temporary memory limit causes the plurality of processes to free a proportional amount of cached data.

* * * * *